No. 821,264. PATENTED MAY 22, 1906.
F. T. SNYDER.
PROCESS OF TREATING WOOD FOR THE EXTRACTION OF TURPENTINE.
APPLICATION FILED DEC. 1, 1905.
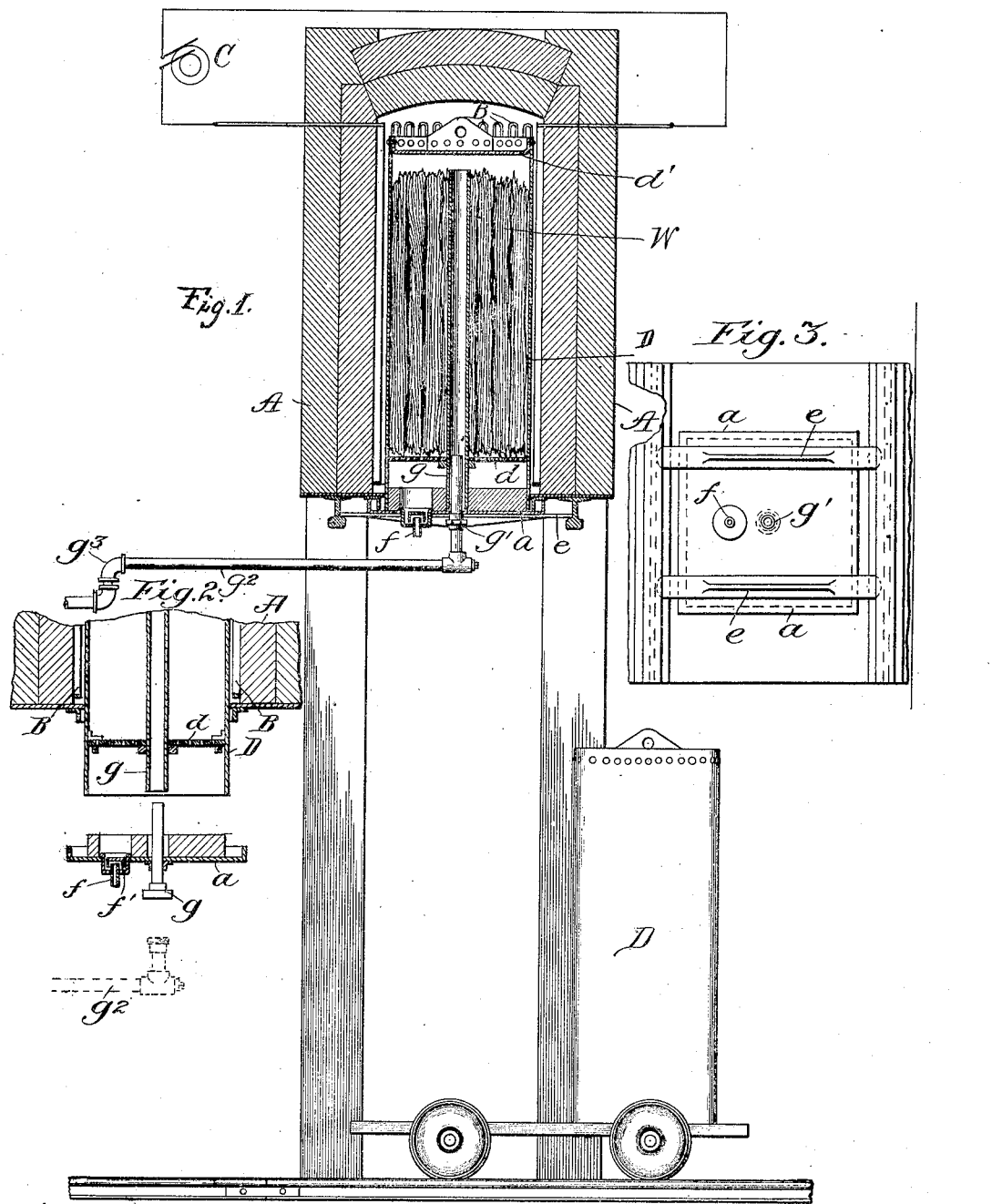
Witnesses:
Geo. C. Dixon
Irving MacDonald
Inventor:
Frederick T. Snyder,
By Barton & Tanner
Attys.

UNITED STATES PATENT OFFICE.

FREDERICK T. SNYDER, OF OAK PARK, ILLINOIS.

PROCESS OF TREATING WOOD FOR THE EXTRACTION OF TURPENTINE.

No. 821,264.  Specification of Letters Patent.  Patented May 22, 1906.

Application filed December 1, 1905. Serial No. 289,731.

*To all whom it may concern:*

Be it known that I, FREDERICK T. SNYDER, a citizen of the United States, residing at Oak Park, in the county of Cook and State of Illinois, have invented a certain new and useful Improvement in Processes of Treating Wood for the Extraction of Turpentine, of which the following is a full, clear, concise, and exact description.

My invention relates to a process of treating wood for the extraction of turpentine therefrom in a simple and economical manner and also involves the formation of pitch and charcoal as by-products.

The object of my invention is the production of clean turpentine, free from tar-oil and other impurities, and the production of clean charcoal, free from ash.

A well-known commercial method of treating fir or other turpentine-bearing wood consists in heating the wood in a closed chamber or retort by a furnace located beneath the chamber. The vapors of turpentine are conducted from the upper portion of the chamber by pipes to suitable condensers. The pitch which exudes from the wood in this process is allowed to fall upon the bottom of the chamber, and this being the point of direct application of heat is subjected to a temperature which decomposes it into carbon and tarry products. These volatile products mix with the turpentine-vapors, rendering the turpentine when condensed black or muddy. The carbon forms a coating on the bottom of the chamber and being a poor conductor interferes with the proper heating of the chamber or retort, rendering it necessary to keep up a hotter fire than would otherwise be necessary. If the retort is made of iron, as is usually the case, this expensive apparatus is rapidly destroyed by this excessive heat required. The above-described process of dry distillation of wood results, therefore, in the loss of a valuable by-product—pitch—said by-product being decomposed into compounds one of which renders the turpentine impure, and the other renders the process very expensive by reason of the increased amount of fuel consumed and the rapid destruction of the apparatus employed in carrying out the process. The present invention, on the other hand, is a continuous process involving the maintenance of the operative heat in the retort or furnace, the production of clean clear turpentine, the saving of the pitch without decomposition thereof, and the saving also of the charcoal in good condition, free from ash.

In accordance with this invention the wood to be treated is inclosed in a vessel having air-tight sides and top, which is then subjected to lateral heat in a furnace, the heat being preferably produced electrically, as this permits of an exact regulation and does not require the admission of air to the furnace. The turpentine-vapors and the pitch are drawn off through the bottom of the vessel, which is comparatively cool, so that the pitch is not decomposed. At the end of the period of distillation the vessel is removed from the furnace, preferably through the bottom thereof, and is maintained in an upright position, the top and sides being still closed to the air. Although the bottom of said vessel may be open, the external air does not rise within the same or have access to the heated charcoal, because of the heated vapors which still fill the vessel and which cannot escape to let in the air. In the same manner the heat of the furnace may be conserved, the top and sides thereof being closed to keep in the heated gases. Another vessel containing wood is then inserted in the furnace for distillation, while the vessel containing the charcoal is allowed to cool, the charcoal being protected from the air. The furnace itself need not be cooled down. An important feature of this process is that the turpentine-vapors as they are given off are withdrawn through the bottom of the vessel instead of through the top or sides, and the vessel is then removed from the furnace while still in an upright position, so that inrush of air to the heated charcoal is prevented.

I will describe my invention more fully by reference to the accompanying drawings, which illustrate one form of apparatus for practicing the same.

Figure 1 is a vertical sectional view of an electric furnace with a removable inner car or vessel which immediately contains the wood for treatment. Fig. 2 is a detail view illustrating the manner in which the inner vessel is removed from the furnace. Fig. 3 is a bottom view of the furnace with the door or cover in place.

The same letters of reference designate the same parts wherever shown.

The furnace or retort A shown in the drawings has its interior side walls lined with a flat heating-coil comprising continuous return-bend conductors B, of cast-iron or other suitable material, extending from the top to the bottom of the walls for the passage of an electric current, by means of which I preferably heat the furnace. The material to be heated in the furnace thus forms no part of the electric circuit. By this means I am enabled to continuously apply heat to the interior of the furnace irrespective of whether or not the furnace is charged with material under process of treatment, thereby maintaining the heat in the furnace during the time one charge is being removed and another inserted. The furnace is maintained at approximately the temperature at which turpentine in the form of vapor is released from the wood. An alternating current of constant potential furnished by a generator C may be used, and in practice I have found that a current of a thousand amperes having a potential of two hundred volts gives satisfactory results for a retort holding one-half of a cord of wood.

The wood to be treated is preferably placed inside of a vessel D somewhat smaller in size than the interior of the furnace and rests upon a grate $d$ near the bottom of said vessel. I employ this separate container in order that when the wood has been sufficiently treated it may be immediately removed without the danger of the residual charcoal or any portion thereof burning to ash by exposure to air in its heated condition. In order to prevent an ingress of air sufficient to damage the charcoal when the heated vessel is removed from the furnace, the top $d'$ of the vessel D is securely sealed, as shown.

In order to prevent the escape of the heated gases from the furnace A during the removal of one vessel containing a charge of wood and the insertion of another, I preferably feed the wood in at the bottom thereof. The bottom $a$ of the furnace is removable, being normally held in place by one or more bars $e$ or in any other suitable manner.

With the structure above described I preserve the charcoal undamaged without the necessity of turning off the heat and permitting the furnace to cool off before removing the treated wood. I also prevent any undue escape of the heat resulting from the opening of the furnace in the act of recharging the same with a fresh supply of wood.

As shown in the drawings, the wood W in the vessel D is arranged so that when inserted in the furnace the grain of the wood extends in a vertical direction. The usual radial splitting of the wood from end to end as it dries out furnishes additional channels to the bottom of the furnace. As a result the pitch which is extracted from the heated wood is furnished an easy path in which to flow and rapidly removes itself from the heated portion of the furnace into the comparatively cool portion lying beneath the grate $d$. Thence it escapes through an opening $f$ in a trap $f'$, sealed by the pitch from the access of air. It will be noted that the pitch being rapidly conducted away from the heat is not decomposed thereby, and consequently the mingling of vapors of the tarry products with the turpentine-vapors prevented.

Any suitable means for rapidly removing one charge of wood and substituting another may be employed. For this purpose I have shown a car which may be moved into position to receive the vessel D from the furnace and substitute another therefor.

The outlet-pipe $g$ for conducting the turpentine-vapors to the usual condensers is preferably located vertically near the middle of the vessel D, with its opening near the top thereof, and extends downward through the bottom of the furnace. It may be uncoupled at $g'$ in order that the arm $g^2$ may be removed in any convenient manner out of the way in charging the furnace. By thus locating the pipe $g$ away from the heated walls B and also removing the pitch as fast as it is formed away from the heated portion of the chamber a wider range of temperature is permissible without the danger of decomposing either the pitch or the turpentine-vapors.

Having thus described my invention, I claim—

1. The process of wood distillation which consists in inclosing the wood in a vessel having air-tight sides and top, heating said vessel in a furnace, drawing off the turpentine-vapors through the bottom of said vessel, removing said vessel in an upright position from the furnace to prevent access of air to the heated charcoal, and substituting in the furnace another vessel containing wood for similar treatment.

2. The continuous process of wood distillation which consists in maintaining the required temperature in a furnace having closed sides and top, charging said furnace with wood through an opening in the bottom thereof, collecting the products of distillation, removing the resulting charcoal from the furnace through the bottom thereof while protecting said charcoal from access of external air thereto, separately cooling said charcoal apart from the furnace and in the absence of external air, and substituting a fresh charge of wood in the furnace while continuously maintaining the same at a temperature sufficient for distillation.

3. The herein-described process of treating wood which consists in inclosing the same in a vessel having air-tight sides and top; inserting said vessel in a furnace also having air-tight sides and top, through an opening in the bottom of said furnace, electrically developing heat in the interior of said furnace sufficient to produce destructive distillation of the wood, collecting the products of distillation, removing the said vessel with the resulting charcoal through the bottom of the furnace, while maintaining said vessel in an upright position to prevent the escape of the heated vapors and the consequent admission of air to the heated charcoal, and substituting another vessel containing wood for treatment, whereby the heat of the furnace is conserved and the charcoal removed therefrom in its heated condition without damage thereto by the external air.

In witness whereof I hereunto subscribe my name this 27th day of November, A. D. 1905.

FREDERICK T. SNYDER.

Witnesses:
 DE WITT C. TANNER,
 ALFRED H. MOORE.